United States Patent [19]
Tsushima et al.

[11] Patent Number: 5,428,485
[45] Date of Patent: Jun. 27, 1995

[54] VIDEO TAPE RECORDER WITH PCM AUDIO RECORDING WITH DEVICE FOR DETECTING IRREGULARITIES IN THE VIDEO SIGNAL

[75] Inventors: Takuya Tsushima, Kamakura; Seiji Higurashi, Tokyo, both of Japan

[73] Assignee: Victor Company of Japan, Ltd., Yokohama, Japan

[21] Appl. No.: 870,063

[22] Filed: Apr. 17, 1992

[30] Foreign Application Priority Data

Apr. 19, 1991 [JP] Japan ................... 3-115468

[51] Int. Cl.[6] ............. G11B 27/365/02; H04N 5/78
[52] U.S. Cl. .................... 360/19.1; 360/36.1; 360/31
[58] Field of Search ............ 360/36.1, 38.1, 31, 360/19.1, 36.2, 64, 10.3, 33.1, 37.1; 358/341, 343, 314, 335, 148, 145, 165, 185, 310, 10; 348/489, 547

[56] References Cited

U.S. PATENT DOCUMENTS

| | | | |
|---|---|---|---|
| 3,943,565 | 3/1976 | Frank et al. | 360/70 |
| 4,319,286 | 3/1982 | Hanpachem | 360/33.1 |
| 5,072,297 | 12/1991 | Kanazawa et al. | 358/143 |
| 5,162,905 | 11/1992 | Itoh et al. | 358/84 |
| 5,181,125 | 1/1993 | Kawakami | 360/10.3 X |

FOREIGN PATENT DOCUMENTS

| | | | |
|---|---|---|---|
| 1105301 | 4/1989 | Japan . | |
| 2145867 | 4/1985 | United Kingdom | 360/13 |

*Primary Examiner*—W. R. Young
*Assistant Examiner*—Jennifer Pearson Wright
*Attorney, Agent, or Firm*—Lowe, Price, LeBlanc & Becker

[57] ABSTRACT

A magnetic recording/reproducing apparatus equipped with a rotating drum having on its circumferential surface video signal heads for recording and reproducing a video signal on and from a recording medium and PCM signal heads for recording and reproducing a PCM audio signal on and from the recording medium. The apparatus further comprising at least a video signal irregularity detecting circuit for detecting a disturbance of the video signal. When detecting the disturbance of the video signal, the irregularity detecting circuit interrupts the recording of the PCM audio signal onto the recording medium in the case that the apparatus simultaneously records the video signal and PCM audio signal.

7 Claims, 6 Drawing Sheets

VIDEO TAPE RECORDER WITH PCM AUDIO RECORDING WITH DEVICE FOR DETECTING IRREGULARITIES IN THE VIDEO SIGNAL

BACKGROUND OF THE INVENTION

The present invention relates to a magnetic recording/reproducing apparatus for recording and reproducing both an audio signal and a video signal on and from a magnetic tape.

A HiFi-VTR (magnetic recording/reproducing apparatus) in the VHS system is known as an apparatus to record and reproduce two kinds of signals such as a video signal and an audio signal on and from the same magnetic tape. In such an apparatus a rotating drum has its circumferential surface at least a pair of rotating heads for recording and reproducing a video signal and a pair of rotating heads for recording and reproducing a HiFi audio signal so that in recording the HiFi audio signal-is first recorded on the entire magnetic layer of the magnetic tape to have a relatively great amplitude and the video signal is then recorded on the surface portion (upper portion) of the magnetic layer and on the audio signal so as to have a relatively small amplitude. As a result, the audio signal remains only at its deep portion (lower portion) of the magnetic tape so as to form two magnetic layers, thus simultaneously recording on the same magnetic tape two kinds of signals whose frequency bands are overlapped with each other. Recently, an attempt is being made to record a PCM audio signal (having a higher sound quality than a conventional FM audio signal) in accordance with the frequency division multiplex technique as disclosed in the Japanese Patent Provisional Publication No. 1-105301 where for accurately reproducing the audio signal an error correcting code is added with respect to the audio signal as will be described hereinafter. However, if a trouble such as instability of the rotational speed of the rotating drum occurs before the addition of the error correcting code, difficulty is encountered to effect suitable processes such as correction, interpolation and muting because of no detection of the error correcting code in reproduction. This causes occurrence of errors to generate abnormal sounds in reproduction.

SUMMARY OF THE INVENTION

It is therefore an object of the present invention to provide a magnetic recording/reproducing apparatus which is capable of preventing generation of abnormal sounds due to disturbance of a video signal or others in recording.

In a magnetic recording/reproducing apparatus of this invention which is equipped with a rotating drum having on its circumferential surface video signal heads for recording and reproducing a video signal on and from a recording medium and PCM signal heads for recording and reproducing a PCM audio signal on and from the recording medium, there is provided at least a video signal irregularity detecting circuit for detecting a disturbance of the video signal to interrupt the recording of the PCM audio signal onto the recording medium, output a signal indicative of a sound silence, or process the PCM audio signal to have a non-coded term configuration in response to the detected disturbance of the video signal when the apparatus simultaneously records the video signal and PCM audio signal. The video signal irregularity detecting circuit detects the disturbance of the video signal on the basis of a variation of a period of a vertical synchronizing signal of the video signal or a variation of a rotational period of the rotating drum.

In addition, a magnetic recording/reproducing apparatus of this invention includes a rotating drum having on its circumferential surface video signal heads for recording and reproducing a video signal on and from a recording medium and PCM signal heads for recording and reproducing a PCM audio signal on and from the recording medium, buffer memory means for temporarily storing the PCM audio signal, write address generating means for generating a write address signal for the buffer memory means, read address generating means for generating a read address signal for the buffer memory means, and decision means for effecting a comparison between the write address signal and the read address signal from the write address generating means and the read address generating means to detect a disturbance of the video signal to perform a process such as interrupting the recording of the PCM audio signal onto the recording medium in response to the detected disturbance of the video signal. When the PCM audio signal is a digital signal to which a correction code is added and a scrambling process is then effected, a gate circuit fixes the PCM audio signal to "0" or "1" in response to the detection of the disturbance of the video signal to have a non-coded term configuration to thereby interrupt the recording of the PCM audio signal. Further, when a correction code including "0" as one coded term is added to the PCM audio signal, the gate circuit fixes at least the PCM audio signal to "1" in response to the detection of the disturbance of the video signal. Moreover, the apparatus further comprises reproduction means for detecting a configuration of a correction code of a PCM audio signal reproduced from the recording medium to mute the PCM audio signal when the configuration of the correction code takes a noncoded term.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
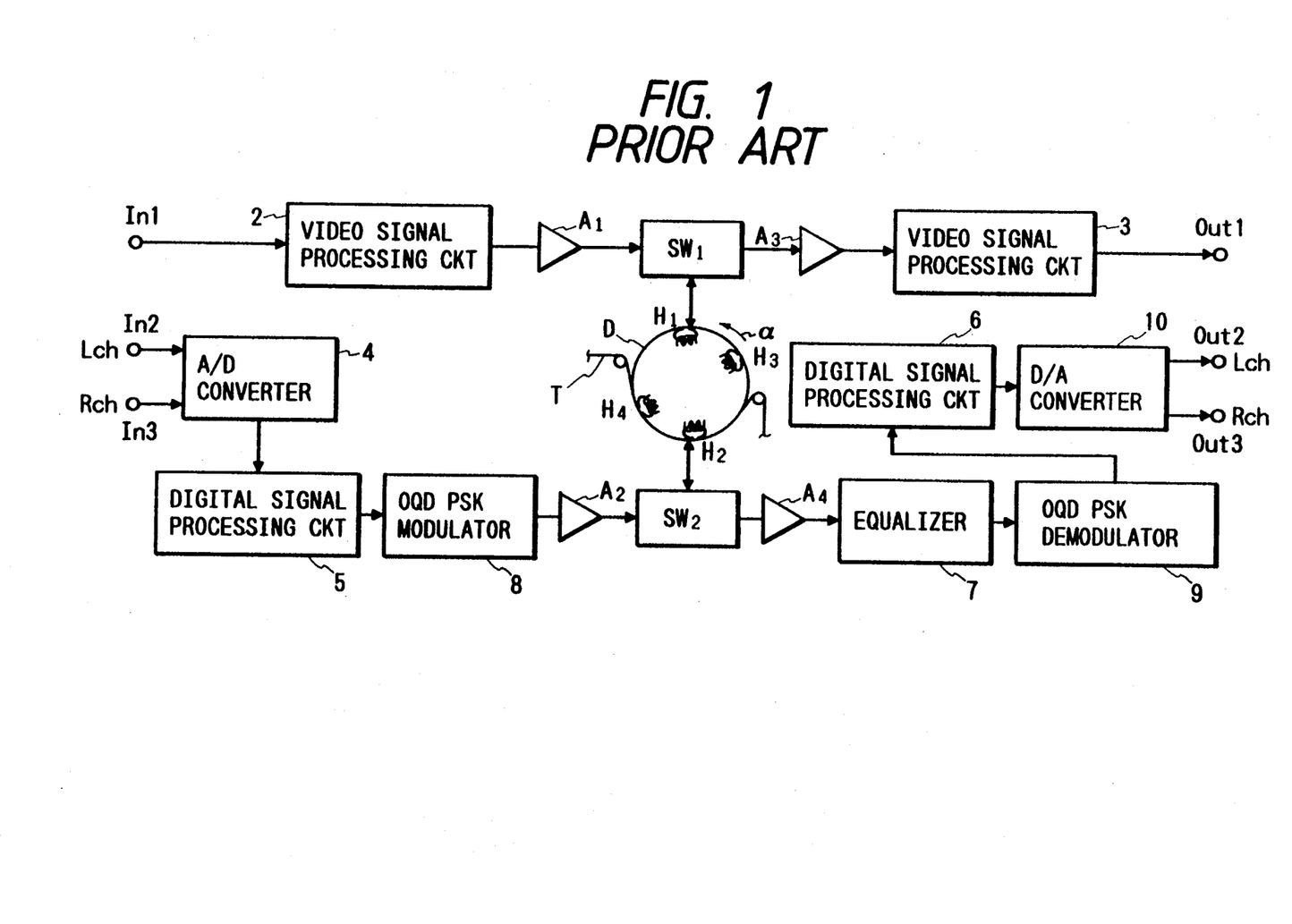
FIG. 1 is a block diagram showing an arrangement of a conventional magnetic recording/reproducing apparatus.

Prior to describing an embodiment of the present invention, a brief description will be made hereinbelow with reference to FIG. 1 in terms of a conventional magnetic recording/reproducing apparatus for a better understanding of this invention. This conventional apparatus is a VTR arranged to record and reproduce on and from a deep portion of a magnetic tape a digital (PCM) audio signal modulated in accordance with a multi-phase PSK (Phase Shift Keying) system such as an offset quadrature differential PSK (OQDPSK) system and a quadradure differential PSK (QDPSK) system. In FIG. 1, The apparatus includes video signal processing circuits 2, 3, an A/D converter 4, digital signal processing circuits 5, 6, an equalizer 7, and an OQDPSK modulator 8. Also included in the apparatus are an OQDPSK demodulator 9, a D/A converter 10, recording amplifiers A1, A2, reproduction amplifiers A3, A4, a rotating drum D, audio and video recording and reproducing heads (rotating heads) H1, H2 and H3, H4, and switching circuits (change-over switches) Sw1, Sw2. Here, the rotating drum is arranged to be rotated in a direction indicated by an arrow α and rotating erase head is omitted for simplification.

A color video signal inputted to an input terminal In1 is processed in the video signal processing circuit 2 and converted into a low-frequency conversion chrominance signal and an FM luminance signal and further frequency-division-multiplexed, and then supplied through the recording amplifier A1 and the switching circuit Sw1 to the rotating heads H3, H4 so as to be recorded on the surface portion of a magnetic tape T which is in the travelling state. On the other hand, L-channel and R-channel audio signals inputted to input terminals In2, In3 are converted into digital (PCM) signals in the A/D converter 4 and time-division-multiplexed and error-correcting-code-addition-processed in the digital signal processing circuit 5, and further modulated in the QDPSK modulator 8 in accordance with the offset quadrature PSK technique so as to be supplied through the recording amplifier A2 and the switching circuit Sw2 to the rotating heads H1, H2 (preceding the rotating heads H3, H4), thereby being recorded on the magnetic tape T.

For reproduction, in response to operation of a reproduction button (not shown) by the user, the aforementioned video signal frequency-division-multiplexed is reproduced by the rotating heads H3, H4 and supplied through the switching circuit Sw1 and the reproduction amplifier A3 to the video signal processing circuit 3 so as to be restored to a reproduction color video signal similar to the original signal and outputted from an output terminal Out1. On the other hand, the PCM audio signal reproduced by the rotating heads H1, H2 is supplied through the switching circuit Sw2, the reproduction amplifier A4, the equalizer 7 and the OQDPSK demodulator 9 to the digital signal processing circuit 6 which in turn performs a predetermined signal processing such as demultiplexing and error correction with respect to the inputted signal, the output signal of the digital signal processing circuit 6 being led to the D/A converter 10 so as to be restored to the original 2-channel analog audio signals which are in turn outputted from output terminals Out2, Out3.

Generally, a VTR is arranged to accurately and surely effect the control of the travelling speed of the magnetic tape T and the rotational speed of the rotating drum D, and for recording and reproducing a digital signal a signal processing such as error correction is effected irrespective of the kind of the recording medium and the contents of the signal to interpolate the lacks of the reproduction signal to keep the quality of the reproduction signal. The error correction of the PCM audio signal is effected in the digital signal processing circuits 5, 6. A detailed method and arrangement for the error correction in the recording system will be described hereinbelow with reference to FIG. 2 where parts corresponding to those in FIG. 1 are marked with the same numerals and characters and the description thereof will be omitted for brevity.

Figure 2:
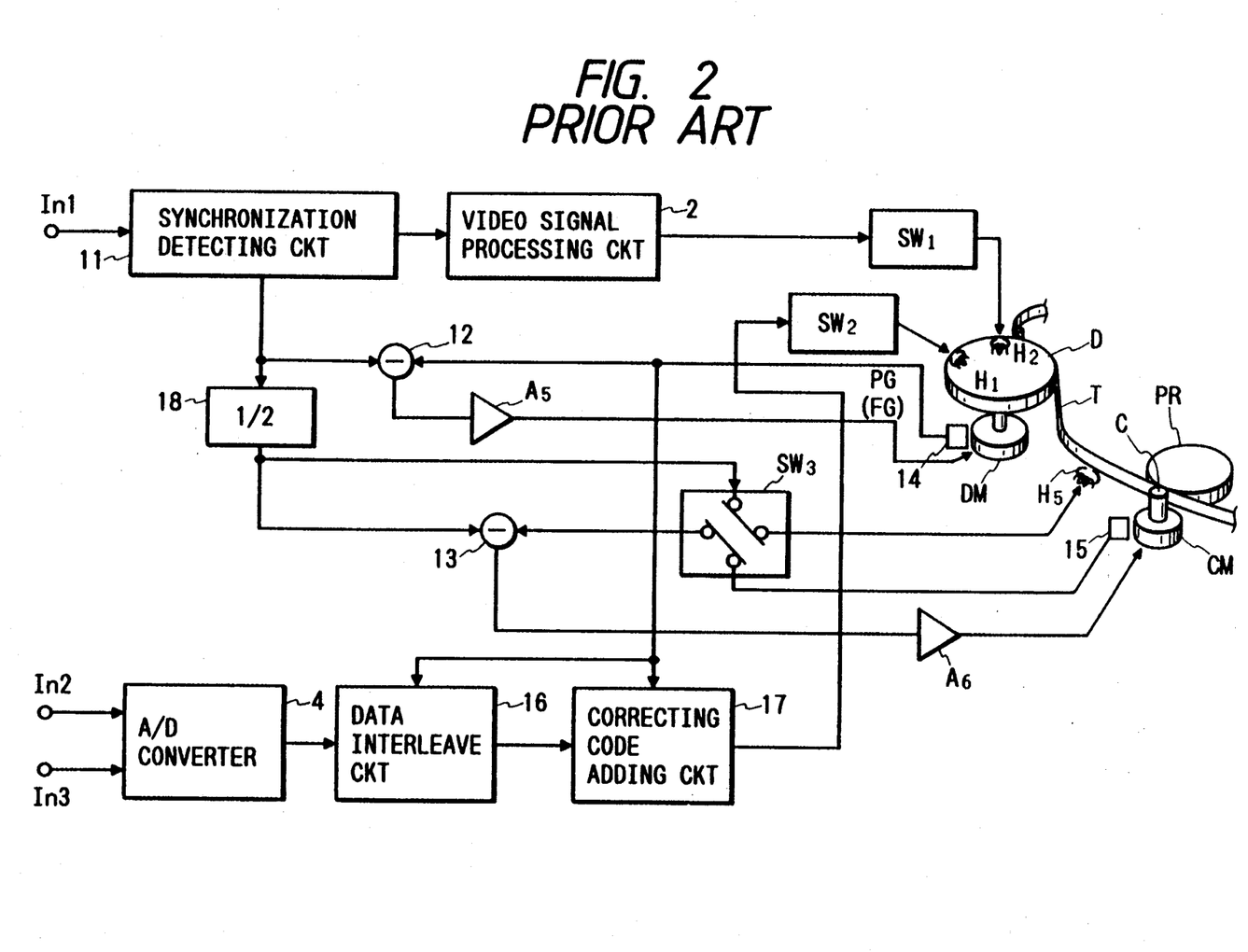
FIG. 2 is a block diagram showing an arrangement of a signal recording system of a conventional magnetic recording/reproducing apparatus.

In FIG. 2, designated at numeral 11 is a synchronization detector for extracting a vertical synchronizing signal fv included in a color video signal from the input terminal In1. The vertical synchronizing signal fv is divided in a ½-divider 18 and then supplied through a switching circuit Sw3 to a CTL (control signal recording/reproducing) head H5 so as to be recorded in a predetermined track of the travelling magnetic tape T and further supplied to a phase comparator 13 to be compared in phase with a PG signal from a PG signal generator (pulse generator) 15 to obtain a control signal. This control signal is supplied through an amplifier (a servo amplifier) A6 to a motor drive circuit (not shown) for a capstan motor CM to perform the rotational speed control of a capstan C to make stable the travelling speed of the magnetic tape T. Moreover, the vertical synchronizing signal fv is also supplied to a phase comparator 12 to be compared in phase with a PD signal (drum flip flop) from a PG signal generator 14 to obtain a control signal. This control signal is supplied through an amplifier (servo amplifier) A5 to a drive circuit (not shown) for a drum motor DM to thereby control the rotational speed of the drum D. In addition, the PG signal from the PG signal generator 14 is also supplied to a data interleave circuit 16 and a correction code adding circuit 17 so as to be time-division-multiplexed with the PCM audio signal from the A/D converter 4 and a correction code from the correction code adding circuit 17 before recording it at the deep portion of the magnetic tape T. Further, in reproduction, these data are read in the digital signal processing circuit 6 to accurately restore the audio signal to the original signal. Here, in the reproduction, the switching circuit Sw3 is switched so that the control signal recorded on the magnetic tape T is detected by the CTL head H5 and then supplied to the phase comparator 13 to be compared in phase with a reference signal from a reference signal generator (not shown) to obtain a control signal.

Since in such a conventional VTR the error correcting code is added to the A/D-converted audio signal and read and processed in the digital signal processing circuit 6 for reproduction, even if a trouble such as instability of the drum D occurs with respect to the PCM audio signal passing through the correction code adding circuit 17, the error is detectable in the error detecting circuit so as to be corrected in the correction circuit and interpolated (or muted) in the interpolation circuit. However, if the trouble occurs before adding the error correcting code, it becomes impossible to perform such processes because of being not detectable, thus generating abnormal sounds in the reproduction.

Figure 3A:
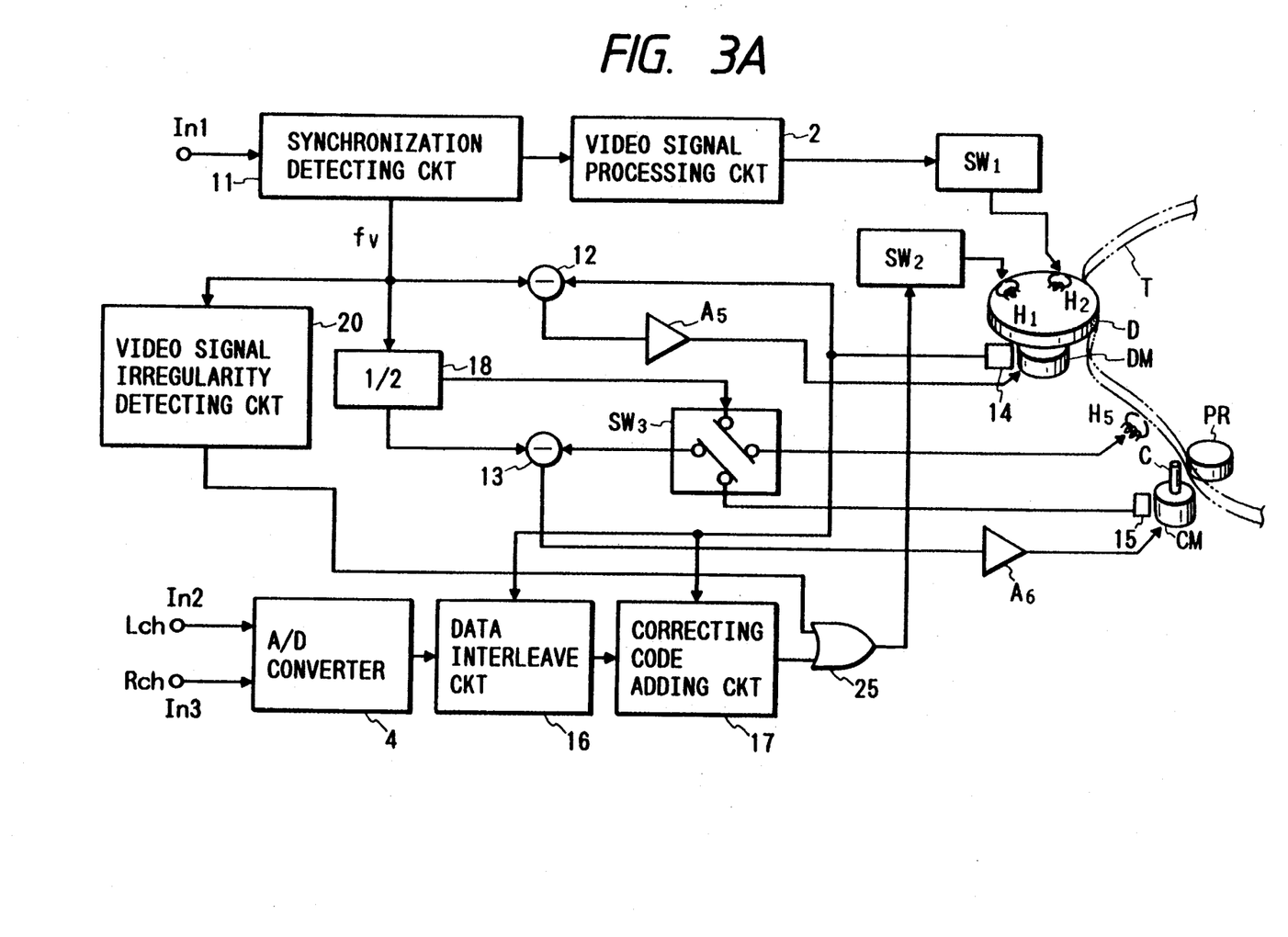
FIG. 3A is a block diagram showing an arrangement of a recording system of a magnetic recording/reproducing apparatus according to a first embodiment of the present invention.
Figure 3B:
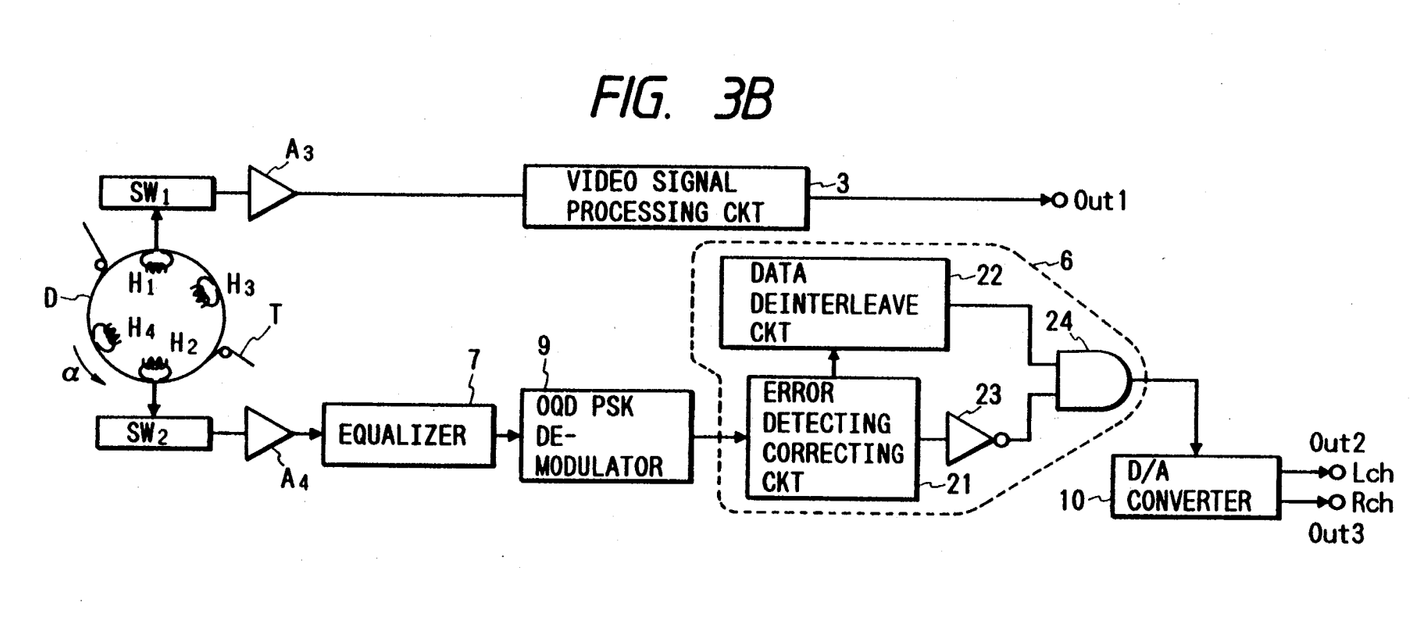
FIG. 3B is a block diagram showing an arrangement of a reproduction system of a magnetic recording/reproducing apparatus according to the first embodiment of this invention.

Referring now to FIGS. 3A and 3B, there is illustrated a magnetic recording/reproducing apparatus according to an embodiment of the present invention. FIG. 3A shows a recording system of the apparatus and the FIG. 3B shows a reproduction system of the apparatus. In FIGS. 3A and 3B, parts corresponding to those in FIGS. 1 and 2 are marked with the same numerals and characters and the description will be omitted for brevity. Further, the recording method of a video signal is the same as that of the conventional apparatus and the description will also be omitted.

In FIGS. 3A and 3B, the apparatus of this invention further includes a video signal irregularity detecting circuit 20, an OR circuit 25, an error detecting and correcting circuit 21, a data deinterleave circuit 22, an inverter 23 and an AND circuit 24. The video signal irregularity detecting circuit 20 is responsive to the vertical synchronizing signal fv from the synchronization detecting circuit 11 for detecting an irregularity of the the inputted color video signal such as interruption and switching to asynchronous state. The irregularity detecting circuit 20 immediately outputs its detection signal to the OR circuit 25 coupled to the correction code adding circuit 17. More specifically, the irregularity detecting circuit 20 outputs a signal with a H level (high level: "1") till the recovery from the irregularity is sufficiently confirmed. In response to the H level signal from the irregularity detecting circuit 20, the OR circuit 25 outputs "1" irrespective of the PCM audio data from the correction code adding circuit 17. The output of the OR circuit 25 is supplied through the switching circuit SW2 to the rotating heads (audio heads) H1, H2 so as to be recorded at a predetermined portion of the magnetic tape T which is travelling. On the other hand, in reproduction, if "1" continues by above a predetermined number when reproducing the PCM audio data from the magnetic tape T, the error detecting and correcting circuit 21 coupled to the OQDPSK demodulator 9 detects the error and supplies an error detection signal through the inverter 23 to the AND circuit 24. That is, at this time one input terminal of the AND circuit 24 is responsive to "0" from the inverter 23 and hence the PCM audio signal is not substantially supplied to the D/A converter 10, thereby muting the audio signal to prevent the generation of abnormal sounds from a speaker to prevent damages of the speaker.

Figure 4:
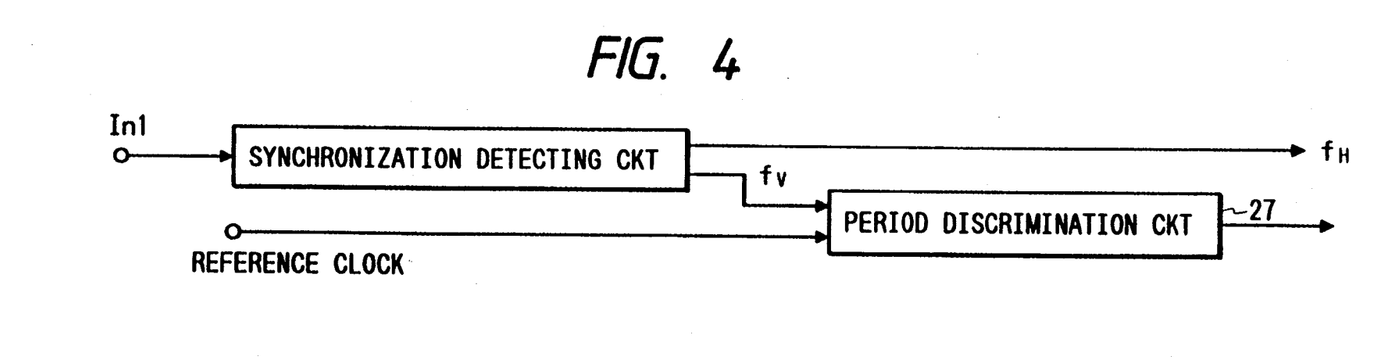
FIG. 4 is a block diagram showing an arrangement for detecting a disturbance of a video signal according to this invention.

FIG. 4 shows a detailed arrangement of the irregularity detecting circuit 20 for detecting the irregularity of the inputted video signal by judging the period of the vertical synchronizing signal fv. In FIG. 4, the video signal inputted through the input terminal In 1 is first inputted to the synchronization detecting circuit 11 so as to derive the horizontal synchronizing signal $f_H$ and the vertical synchronizing signal fv, respectively. The vertical synchronizing signal fv is led to a period discrimination circuit 27 to be compared in period with a reference clock signal from a reference signal generator, not shown. When the comparison result (the difference therebetween) is above a predetermined value, the period discrimination circuit 27 decides a period abnormality and continuously outputs "1" to the OR circuit 25. More specifically, for example, in the case of the NTSC signal, since fv=59.94 Hz, the period $\tau=1/59.94=16.68$ msec. For example, if the difference within ±0.5% is decided as normality by taking into account the jitter of the drum D, the accuracy of the reference clock and others, since 16.68×0.5/100=0.08 msec, the normality decision is made when not exceeding 16.68±0.08 msec and the abnormality decision is made when being out of the range.

Figure 5:
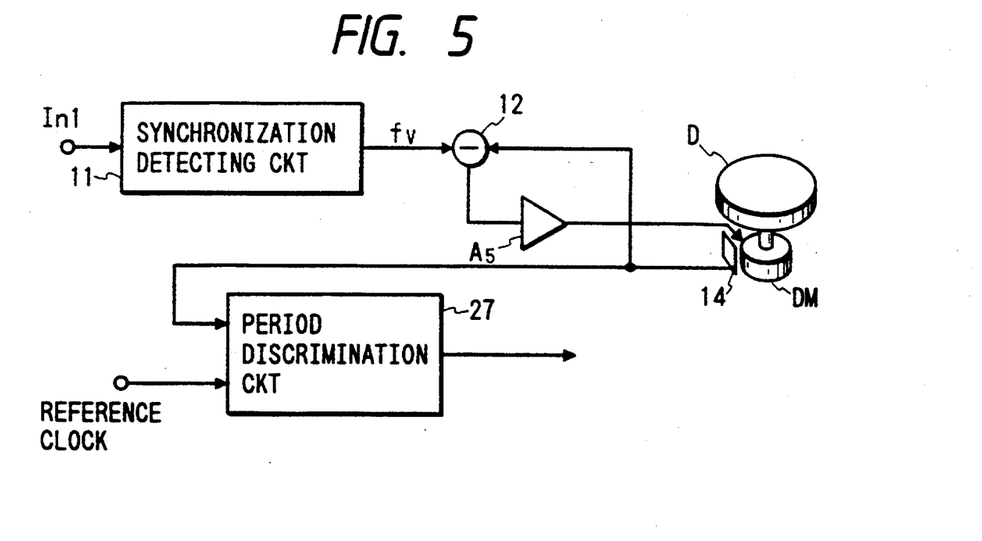
FIG. 5 is a block diagram showing another arrangement for detecting a disturbance of a video signal according to this invention.

Secondly, a detailed arrangement of the irregularity detecting circuit 20 for detecting the irregularity by judging the period of the rotating drum D (the drum FF) will be described hereinbelow with reference to FIG. 5. In FIG. 5, in place of the vertical synchronizing signal fv, the PG signal (the drum FF) from the PG signal generator 14 for detection of the rotational speed of the drum motor DM is supplied to the period discrimination circuit 27 so as to be compared in period with a reference clock signal. If the difference therebetween exceeds a predetermined value, the period discrimination circuit 27 decides the period abnormality and continuously outputs "1" to the OR circuit 25. Although this arrangement has a disadvantage that the allowable time from the abnormality detection to the stop of the recording of the PCM audio signal becomes shortened, if the disturbance degree of the video signal is relatively small, the recording tends to be normally made with the drum D slowly responding due to the inertia of the drum D, thereby reducing the stop of the recording of the PCM audio signal.

Figure 6:
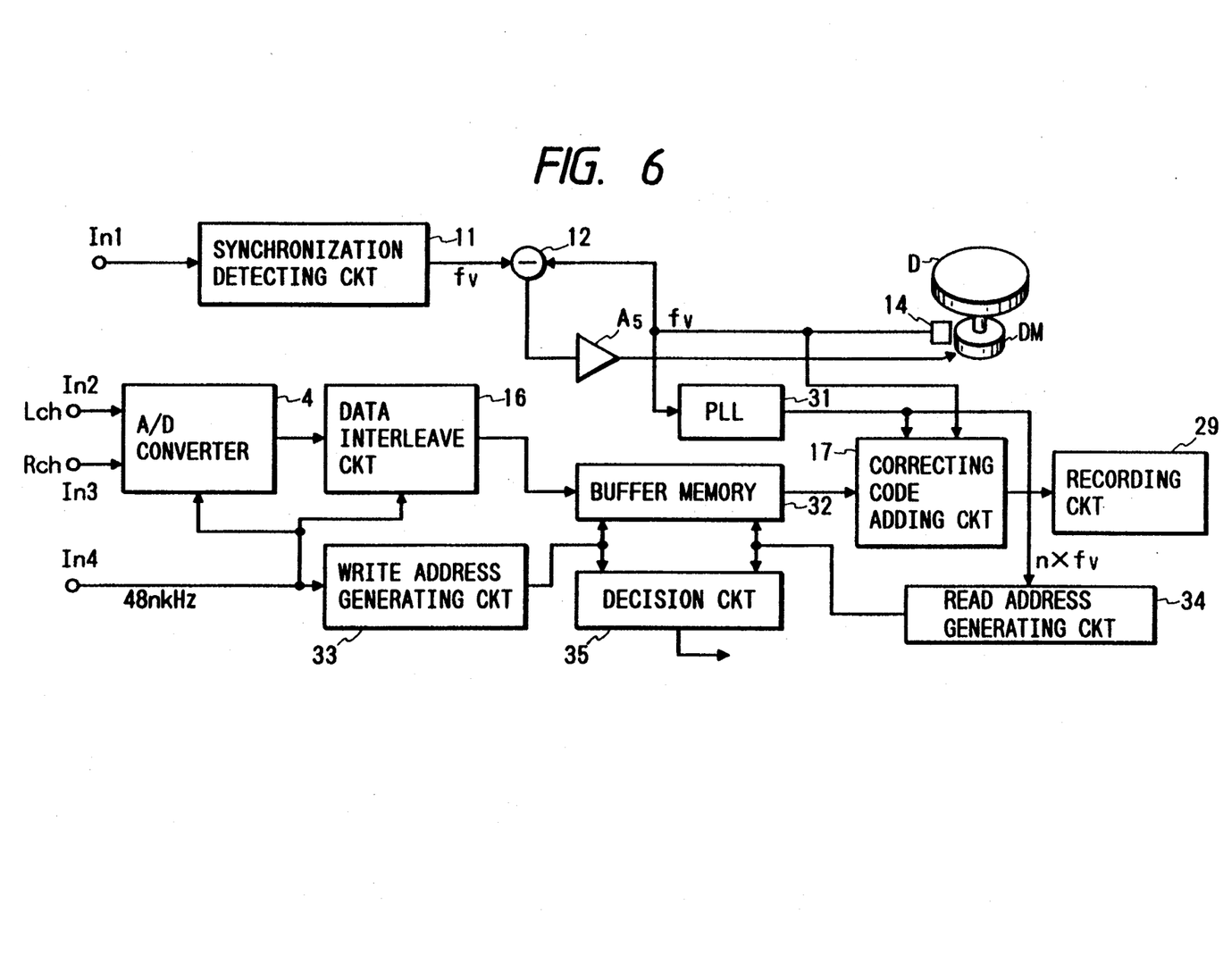
FIG. 6 is a block diagram showing an arrangement of a recording system of a magnetic recording/reproducing apparatus according to a second embodiment of this invention.

FIG. 6 shows an arrangement of the recording section of the VTR of this invention which effects the abnormality detection on the basis of the amount of the data stored in a buffer memory where parts corresponding to those in FIGS. 3A and 3B are marked with the same numerals and characters and the description thereof will be omitted for brevity. In FIG. 6, numeral 31 represents a PLL (phase locked loop) circuit, 32 designates an FIFO type buffer memory, 33 depicts a write address generating circuit for the buffer memory 32, 34 denotes a read address generating circuit for the buffer memory 32, 35 indicates a buffer-occupied and non-occupied state decision circuit, and 29 is a recording circuit. Here, the A/D converter 4, data interleave circuit 16 and the write address generating circuit 33 operate in response to a reference clock signal whose frequency is n (integer) times of 48 kHz (equal to the sampling frequency of the PCM audio signal).

When the PCM audio data from the data interleave circuit 16 is written in the buffer memory 32, the PCM audio data is arranged to be read out after elapse of the buffer time (a predetermined delay time). With this arrangement, the abnormality decision can be made when the comparison result (difference) between the write address and the read address does not fall within a predetermined range. Particularly, since in the read address a clock signal is produced from the above-mentioned drum FF by the PLL so as to reset the sequence in response to the edge of the drum FF by using the produced clock signal, the disturbance of the drum FF causes the abnormality of the buffer. Thus, the abnormality of the drum FF and the buffer abnormality due to other causes are detected so that the decision circuit 35 outputs a control signal to the recording circuit 29 or others in response to the detection of the abnormality to stop the recording operation.

Figure 7:
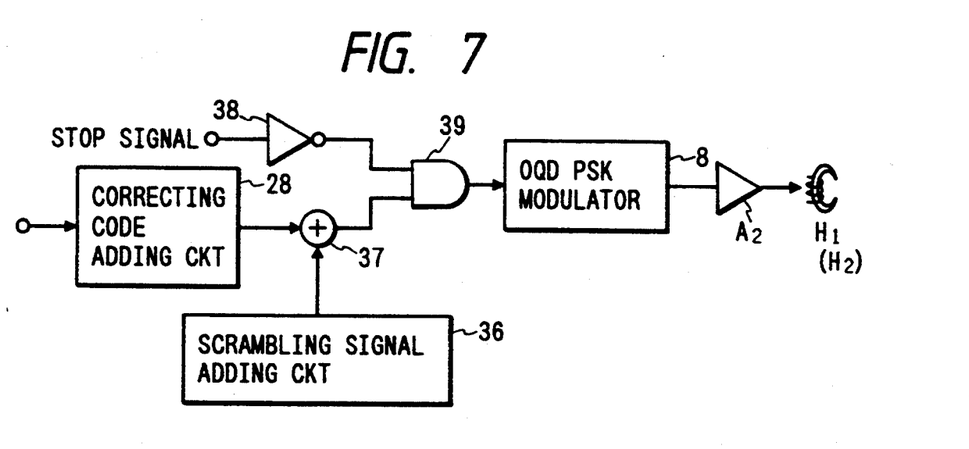
FIG. 7 is a block diagram showing a circuit arrangement for stopping the recording according to this invention.
Figure 8:
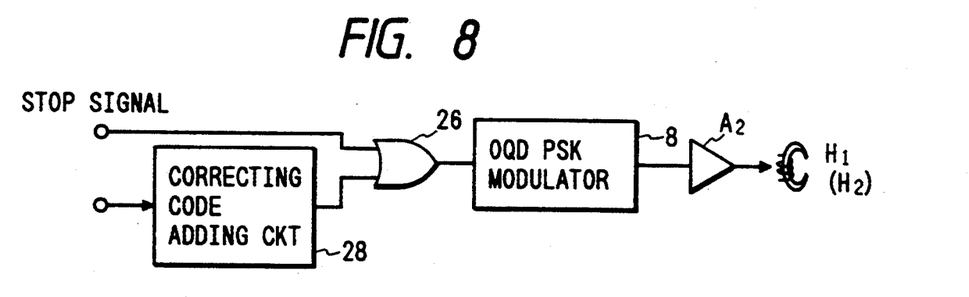
FIG. 8 is a block diagram showing another circuit arrangement for stopping the recording according to this invention.

FIG. 7 shows a detailed arrangement for realizing the stop of the recording operation. In FIG. 7, numeral 28 represents a correction code adding circuit, 36 designates a scrambling signal adding circuit, 37 denotes an exclusive OR circuit, 38 is an inverter, and 39 indicates an AND circuit. Here, the correction code adding circuit 28, scrambling signal adding circuit 36 and exclusive OR circuit 37 can be included in the digital signal processing circuit 5. In the case of the signal scrambled, if a gate (the inverter 38, the AND circuit 39) is added so as to fix the output data of the AND circuit 39 to "0" as well as the AND circuit 24, in reproduction the PCM audio data is substantially decided as the error, thereby effecting the muting operation. On the other hand, in the case of a non-scrambled signal, there is the possibility that in reproduction the error cannot be found as the if the output data is fixed to "0", and therefore, as illustrated in FIG. 8, the inverter 38 is not provided and an OR circuit 26 is provided in place of the AND circuit 39, whereby the data to be supplied to the OQDPSK modulator 8 is fixed to "1". Here, in the case of a signal of a direct recording system which does not include the QPSK modulator, the stopping of the recording (muting) can similarly be effected.

The above-described arrangement according to this invention can offer the effects: 1) preventing generation of an abnormal sound in reproduction irrespective of disturbance of the video signal in recording; 2) simplifying the circuit arrangement because the signal processing is effected in the recording; and 3) surely resolving the problem of the abnormal sound generation in the VTR having a function to record the PCM audio signal.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention. For example, although in the above description all the data are processed, it is also appropriate to process a portion of the data to be recorded. That is, it is possible that the synchronizing signal pattern and the block address are normally recorded and only the data is processed as the without codeword, i.e., as the error. Although the above description is made on the assumption that the correction code is of the type such as a BCH code and a lead solomon code that "0" is decided as a code term, in the case of no addition of the correction code to the PCM audio signal, it is preferable to arrange the apparatus to interrupt the recording of the PCM, record a signal indicative of no generation of a sound, or record an index signal for the muting in reproduction. In addition, although the above description has been made in terms of the VHS type HiFi VTR where two kinds of signals (a video signal and an audio signal) are recorded in two magnetic layers of a magnetic tape, it is also possible to apply this invention to a VTR in which one track of the magnetic tape is divided into two portions for respectively recording the video signal and the audio signal or a VTR in which the audio signal is recorded on the extension line of the video signal recording track.

What is claimed is:

1. A magnetic recording apparatus equipped with a rotating drum having heads on its circumferential surface for recording a video signal and a PCM audio signal simultaneously on a recording medium, said apparatus comprising:

video signal irregularity detecting means for detecting a disturbance of said video signal by comparing a period of a vertical synchronizing signal with a reference clock signal; and output means, coupled to said video signal irregularity detecting means for outputting a signal indicative of a sound silence in response to the detected disturbance of said video signal when said apparatus simultaneously records said video signal and PCM audio signal.

2. A magnetic recording apparatus equipped with a rotating drum having heads on its circumferential surface for recording a video signal and a PCM audio signal simultaneously on a recording medium, said apparatus comprising:

video signal irregularity detecting means for detecting a disturbance of said video signal by comparing a period of a vertical synchronizing signal with a reference clock signal; and process means, coupled to said video signal irregularity detecting means for processing said PCM audio signal to have a without codeword configuration in response to the detected disturbance of said video signal if said PCM audio signal includes a correction code when said apparatus simultaneously records said video signal and PCM audio signal.

3. A magnetic recording apparatus equipped with a rotating drum having heads on its circumferential surface for recording a video signal and a PCM audio signal including a correction code simultaneously on a recording medium, said apparatus comprising:

buffer memory means for temporarily storing said PCM audio signal;

write address generating means for generating a write address signal for said buffer memory means;

read address generating means for generating a read address signal for said buffer memory means; and decision means for effecting a comparison between said write address signal and said read address signal from said write address generating means and said read address generating means to detect a disturbance of said video signal to process said PCM audio signal to have a without codeword configuration in response to the detected disturbance of said video signal in response to the detected disturbance of said video signal.

4. A magnetic recording apparatus equipped with a rotating drum having heads on its circumferential surface for recording a video signal and a PCM audio signal simultaneously on a recording medium, said apparatus comprising:

buffer memory means for temporarily storing said PCM audio signal;

write address generating means for generating a write address signal for said buffer memory means;

read address generating means for generating a read address signal for said buffer memory means; and decision means for effecting a comparison between said write address signal and said read address signal from said write address generating means and said read address generating means to detect a disturbance of said video signal to interrupt the recording of said PCM audio signal onto said recording medium in response to the detected disturbance of said video signal, wherein, when said PCM audio signal is a digital signal to which a correction code is added and a scrambling process is then effected, said apparatus further comprises a gate circuit for fixing said PCM audio signal to "0" or "1" in response to the detection of the disturbance of said video signal to have a without codeword configuration to thereby interrupt the recording of said PCM audio signal.

5. A magnetic recording apparatus as claimed in claim 4, wherein, when said correction code including "0" as one coded term is added to said PCM audio signal, said gate circuit fixes at least said PCM audio signal to "1" in response to the detection of the disturbance of said video signal.

6. A magnetic recording apparatus as in claim 4, wherein said apparatus further comprises reproduction means for detecting a configuration of a correction code of a PCM audio signal reproduced from said recording medium to mute said PCM recording signal when said configuration of said correction code is without codeword.

7. A magnetic recording apparatus equipped with a rotating drum having heads on its circumferential surface for recording a video signal and a PCM audio signal simultaneously on a recording medium, said apparatus comprising:

video signal irregularity detecting means coupled to said rotating drum for detecting a disturbance of said video signal by comparing a period of rotation of said rotating drum with a reference clock signal; and process means, coupled to said video signal irregularity detecting means for processing said PCM audio signal to have a without codeword configuration in response to the detected disturbance of said video signal if said PCM audio signal includes a correction code when said apparatus simultaneously records said video signal and said PCM audio signal.

* * * * *